(12) United States Patent
Faus

(10) Patent No.: US 9,304,819 B2
(45) Date of Patent: Apr. 5, 2016

(54) VIRTUAL DEPLOYMENT

(75) Inventor: Lee Faus, Holly Springs, NC (US)

(73) Assignee: Red Hat, Inc., Raleigh, NC (US)

(*) Notice: Subject to any disclaimer, the term of this patent is extended or adjusted under 35 U.S.C. 154(b) by 1445 days.

(21) Appl. No.: 11/754,520

(22) Filed: May 29, 2007

(65) Prior Publication Data
US 2008/0301674 A1 Dec. 4, 2008

(51) Int. Cl.
G06F 9/455 (2006.01)
G06F 9/46 (2006.01)
G06F 15/173 (2006.01)
G06F 9/50 (2006.01)

(52) U.S. Cl.
CPC .............. *G06F 9/5005* (2013.01); *G06F 9/455* (2013.01); *G06F 9/45558* (2013.01); *G06F 9/50* (2013.01); *G06F 2009/4557* (2013.01); *G06F 2009/45562* (2013.01)

(58) Field of Classification Search
USPC ................................................ 718/1; 709/203
See application file for complete search history.

(56) References Cited

U.S. PATENT DOCUMENTS

| 5,894,571 | A * | 4/1999 | O'Connor | 713/2 |
|---|---|---|---|---|
| 6,490,445 | B1 * | 12/2002 | Holmes | 455/419 |
| 6,615,240 | B1 * | 9/2003 | Sullivan et al. | 709/205 |
| 7,127,506 | B1 * | 10/2006 | Schmidt et al. | 709/224 |
| 7,356,576 | B2 * | 4/2008 | Rabe | 709/221 |
| 7,356,679 | B1 * | 4/2008 | Le et al. | 713/1 |
| 7,577,722 | B1 * | 8/2009 | Khandekar et al. | 709/220 |
| 8,286,174 | B1 * | 10/2012 | Schmidt et al. | G06F 9/5077 709/226 |
| 2002/0016774 | A1 * | 2/2002 | Pendlebury | 705/51 |
| 2002/0069335 | A1 * | 6/2002 | Flylnn, Jr. | 711/153 |
| 2002/0069369 | A1 * | 6/2002 | Tremain | 713/201 |
| 2002/0120660 | A1 * | 8/2002 | Hay et al. | 709/100 |
| 2002/0194482 | A1 * | 12/2002 | Griffin et al. | 713/176 |
| 2004/0109018 | A1 * | 6/2004 | Rollins | 345/736 |
| 2005/0027827 | A1 * | 2/2005 | Owhadi et al. | 709/219 |
| 2005/0235044 | A1 * | 10/2005 | Tazuma | 709/217 |
| 2006/0218544 | A1 * | 9/2006 | Chakraborty | G06F 8/63 717/168 |
| 2006/0265656 | A1 * | 11/2006 | Lambert et al. | 715/705 |
| 2006/0294517 | A1 * | 12/2006 | Zimmer et al. | 718/1 |
| 2007/0043860 | A1 * | 2/2007 | Pabari | 709/224 |
| 2007/0067435 | A1 * | 3/2007 | Landis et al. | 709/224 |
| 2007/0234337 | A1 * | 10/2007 | Suzuki et al. | 717/168 |
| 2008/0071870 | A1 * | 3/2008 | Zhan | 709/206 |
| 2008/0082977 | A1 * | 4/2008 | Araujo | G06F 9/455 718/1 |
| 2008/0089338 | A1 * | 4/2008 | Campbell et al. | 370/392 |
| 2008/0098392 | A1 * | 4/2008 | Wipfel et al. | 718/1 |
| 2008/0209415 | A1 * | 8/2008 | Van Riel et al. | 718/1 |
| 2009/0094316 | A1 * | 4/2009 | Chen et al. | 709/203 |
| 2009/0204961 | A1 * | 8/2009 | DeHaan et al. | 718/1 |

OTHER PUBLICATIONS

U.S. Appl. No. 11/747,220, filed May 10, 2007, Jason S. Hibbets.
U.S. Appl. No. 11/759,785, filed Jun. 7, 2007, N. Lee Faus et al.
U.S. Appl. No. 11/756,334, filed May 31, 2007, John R. Mattox et al.

* cited by examiner

Primary Examiner — Charles Swift
(74) Attorney, Agent, or Firm — Lowenstein Sandler LLP

(57) ABSTRACT

An embodiment relates generally to a method of providing computer services. The method includes receiving at least one user-specified requirements for a computer system instantiation and developing a configuration file base on the at least one user-specified requirements. The method also includes instantiating a virtual machine based on the configuration file and providing the virtual machine as the instantiation of the computer system for remote access.

21 Claims, 7 Drawing Sheets

VIRTUAL DEPLOYMENT

FIELD

This invention relates generally to computers services, more particularly, to systems and methods for virtual deployment of computer services.

DESCRIPTION OF THE RELATED ART

The businesses of the Fortune 500 spend large sums of money on their information technology (IT) infrastructure. The investment in IT can improve efficiency and productivity of the business in sales, accounting, financial support, research, etc.

Although these businesses often purchase large amounts of hardware and software, they also have the financial wherewithal to hire staff to maintain the IT infrastructure. The IT department of these businesses can assist the users with errors as well as repair any broken hardware. The IT department can also plan for future improvements in the software and hardware. The IT department can also be responsible for training of the users in the IT system, which includes supported software applications and underlying hardware. Most importantly, the IT department can recover the IT infrastructure in the event of a catastrophic event.

Small businesses typically do not have the financial resources to afford an IT department. However, small businesses need the services that an IT department of a Fortune 500 company can provide: technical support in the event of a hardware and/or software failures, training of new employees in the existing system, integrate new technologies (software/hardware), etc.

Since small businesses cannot typically afford a full-time IT staff, a typical small business can hire consultants or go to a computer services company to implement and support their IT infrastructure. However, this is typically an unsatisfactory solution because the consultants and/or services company tend not to be available around the clock or when the problem occurs.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to a method of providing deployment services for a user. More specifically, a virtual deployment service can be configured to obtain configuration information from the user. The configuration information can include, among other things, number of users, desired hardware platform, types of applications, security requirements, etc. The configuration information provides the necessary information to instantiate a virtual machine that is optimized based on the hardware, software and/or operational requirements. The virtual deployment service can then provide access to the user-specified virtual machine via a universal resource locator or a log-in at a secure site The virtual deployment service can also be configured to provide a back-up copy of the user-specified virtual machine to the user to implement on the user equipment.

Figure 1:
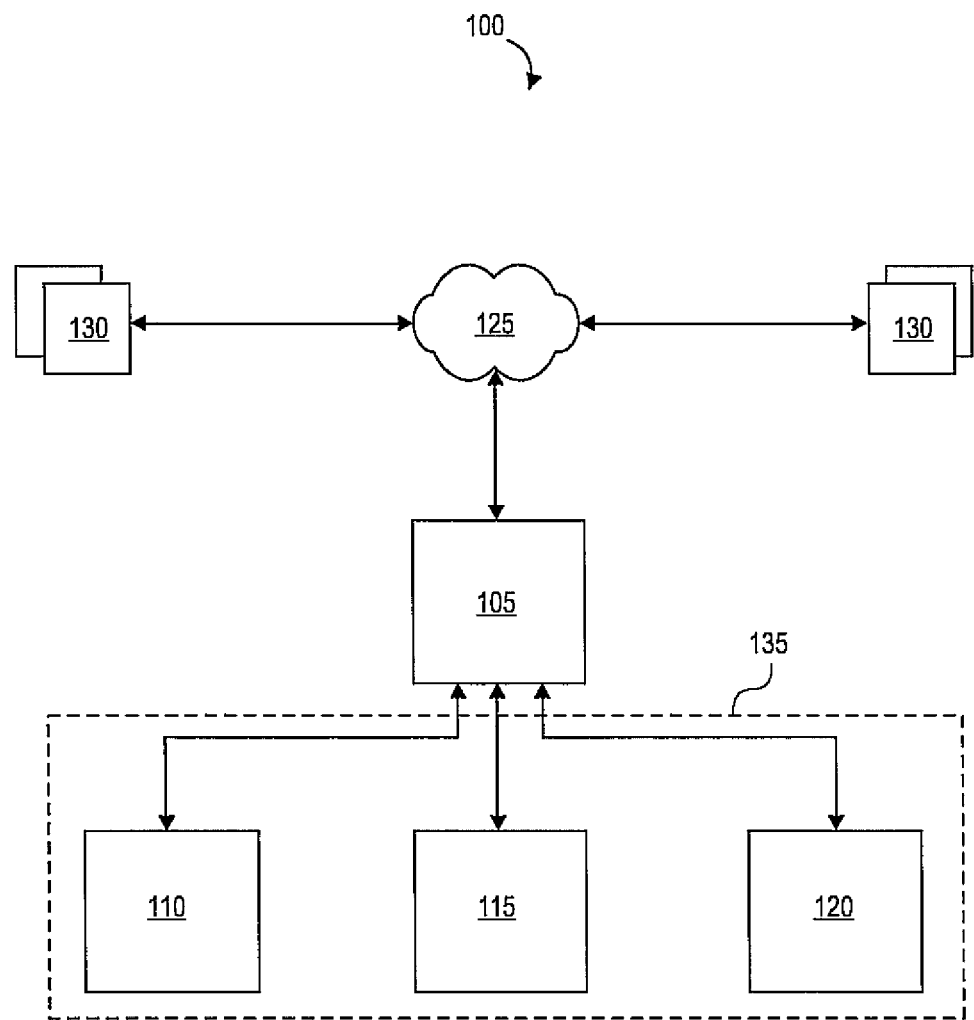
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a service portal 105 coupled to a network 125. Users 130 can interface with the service portal 105 through the network 125. The network 125 can be a combination of local area networks, wide area networks, public networks, and private networks such as the Internet.

The users 130 can be interface with the service portal 105 using computing platforms such as personal computers, workstations, private local area networks (e.g., business entity or government entity) or other similar device that can provide network access and interact with the service portal 105.

In some embodiments, the service portal 105 can be configured to provide services. As a non-limiting example, the service portal 105 can be configured to provide information for users to research, compare and purchase software, hardware and consulting services in support of the those software and/or hardware purchases. The service portal 105 can also be configured to provide support services by subscription to those same software and/or hardware purchases. The service portal 105 can further be configured to provide a knowledgebase for a user in a community can search for answers regarding issues. The community can comprise of registered and non-registered users.

The service portal 105 can be configured to provide at least the described services with a service backend 135. The service backend 135 can comprise at least a knowledge server 110, an issue tracker server 115 and a chat server 120.

The knowledge server 110 can be configured to provide a knowledgebase for the system 100. The knowledgebase can comprise of Wiki pages, articles, frequently asked questions, transcripts of chat sessions, forums, and other informational items related to issues deemed worth discussing by the community. The knowledge server 110 can also be configured to search and retrieve requested informational items from third party sites such as Google™, Yahoo™, etc. The knowledge server 110 can then rank and prioritize the search results from internal and external sources for the requesting user based on a single interface provided by the server portal 105. In some embodiments, the knowledge server 110 can be implemented on a separate server using open-source technologies.

The service portal 105 can also be configured to interface with the issue tracker server 115, which provide support services for the service portal 105. More particularly, a user may have a problem or issue with a purchased software and/or hardware from the service portal 105. The user can return to the service portal 105 and request support services based on a purchased service subscription through a user interface generated by the service portal 105. The service portal 105 can redirect the support request to the issue tracker server 115. The issue tracker server 115 can open an associated service ticket for resolution by support personnel. The issue tracker server 115 can also be configured to attach transcripts of any chat sessions between the support personnel and the user as well as documenting the solution(s) to the issue of the user. In some aspects, the documented solution can be converted into an article, added to a frequently asked question list, Wiki page, etc., and passed onto the knowledge server 110.

The chat server 120 can be configured to couple with the service portal 105. A user with an issue or question can log into the service portal 105 and search for solutions and/or answers. The service portal 105 can generate a user interface and display an option for requesting assistance via a chat session. If a user selects this option, the service portal 105 can pass the request over to the chat server 120. The chat server 120 can be configured to provide the chat session to the user via another user interface provided by the service portal 105. The chat server 120 can also be configured to save the chat sessions for later review. For example, support personnel can turn the chat session into an article or extract discussed solutions in the chat sessions into or add to a frequently asked questions list.

Figure 2:
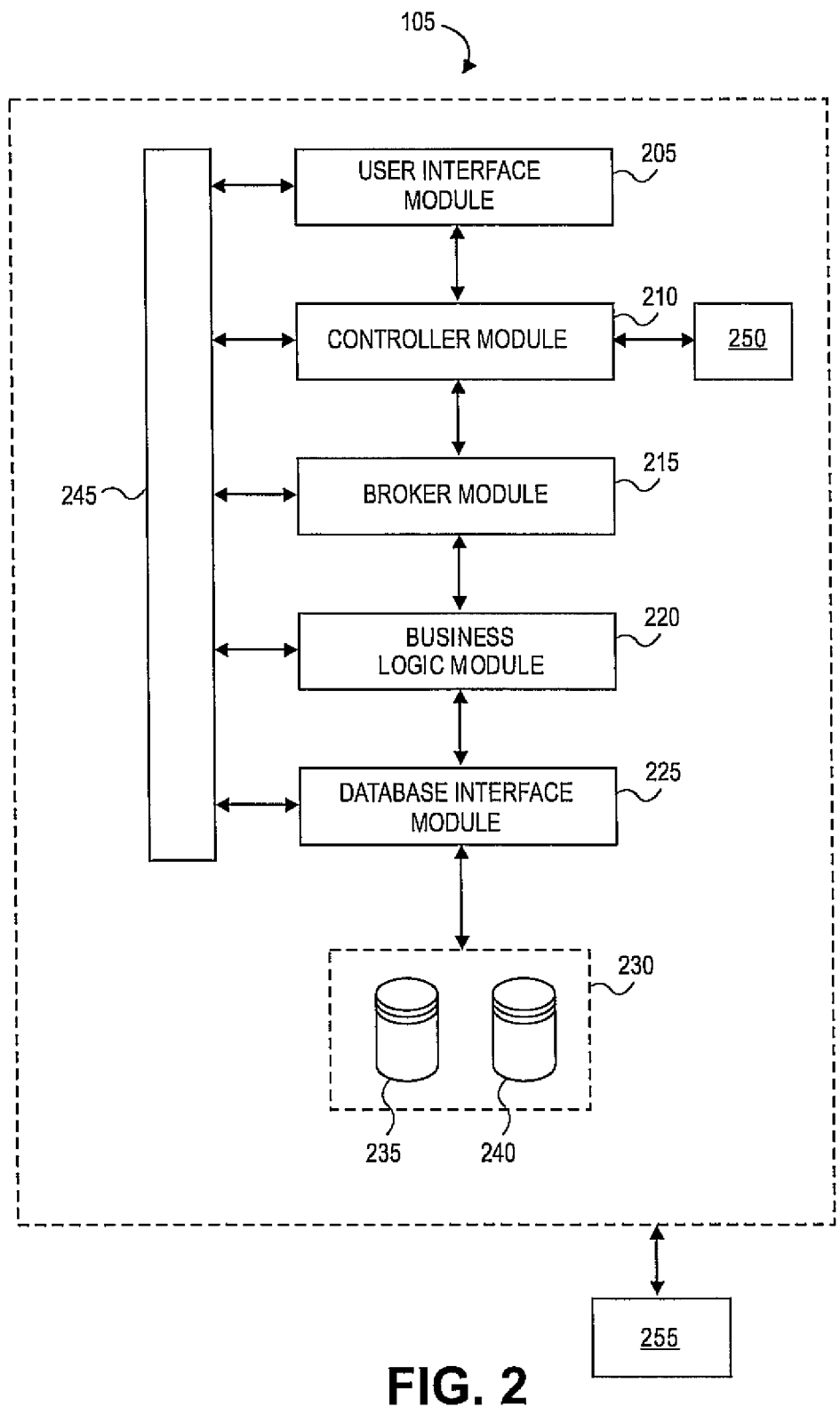
FIG. 2 illustrates an exemplary service portal of the system shown in FIG. 1 in accordance with another embodiment.

FIG. 2 illustrates a more detailed block diagram of the service portal 105 in accordance with another embodiment. It should be readily apparent to those of ordinary skill in the art that the service portal 105 depicted in FIG. 2 represents a generalized schematic illustration and that other components may be added or existing components may be removed or modified.

As shown in FIG. 2, the service portal 105 can comprise a user interface module 205, a controller module 210, a broker module 215, a business logic module 220, a database interface module 225, and a logging module 245. The user interface module 205 can be configured to generate the graphical user interfaces ("GUIs") for users to interact with service portal 105. The user interface module 205 can generate the necessary functionality of the GUIs based on hypertext markup language ("HTML") code, cascading style sheets ("CSS") and/or Java Server Pages ("JSP").

The user interface module 205 can be configured with a controller module 210, which is configured to provide code support for the functionality embedded in the GUIs of the user interface module 205. More particularly, the controller module 210 can comprise of DWR, Dojo, and a library of JavaScript apps. The controller module 210 can be implemented using direct web remoting (DWR). DWR can be considered a Java and JavaScript open source library which allows a programmer to write Asynchronous JavaScript and XML ("Ajax") web applications or interactive web applications. DWR allows generally JavaScript code in the GUI generated by the user interface module 205 to use Java methods.

The Dojo component can be considered an open-source JavaScript Toolkit to construct the dynamic web user interfaces. As such, the controller module 210 can dynamically generate user interfaces to pass along to the user interface module 205 for display to a user.

The library of JavaScript apps can define a list of predetermined functionality that users are likely to call. For example, one JavaScript can be "Get Price of Product X".

The controller module 210 can also be coupled with the broker module 215. The broker module 215 can be configured to provide a high-level business logic for the service portal 105. More particularly, the business logic can generally filter and direct an incoming request to the appropriate server of the service backend 135 (shown in FIG. 1). For example, the broker module 215 can receive a request for delivery terms on a selected piece of hardware. The broker module 215 can identify the server that can satisfy the request, e.g., service portal 105, and forward the request. Similarly, a request for technical support can be identified by the broker module 215 and be forwarded to the issue tracker server 115 to be serviced.

The broker module 215 can also be coupled with business logic 220, which is configured to contain the logic to provide the desired business services from the broker module 215 such as processing requests for the database 230. The business logic module 225 can also provide a schema for inquiries to the databases 230. The databases 230 can, abstractly, contain two databases: a user profile database 235 and a product catalog 240. The databases 230 can be implemented using any type of database systems provided by vendors such as MySQL, Oracle, Sybase, International Business Machines, etc. The business logic module 220 can provide the schema to formulate queries to pass to the databases 230 through the database interface module 225. The business logic 220 can be implemented using an open source lightweight framework such as Spring Application Framework supported by data access objects, beans, and manager.

The database interface module 225 can be configured to provide an abstraction between the databases 230 and the business logic 220. The database interface module 225 can be implemented with Hibernate or other similar abstractions. The database interface module 225 provides object relational mapping and persistence management with the databases 230.

The modules 205-225 of the service portal 105 can also be implemented using be implemented using an open source servlet container and webserver such as Tomcat™ in some embodiments. Other embodiments could use proprietary servlet container and webserver technologies.

The logging module 245 can be configured to couple with the user interface module 205, the controller module 210, the broker module 215, the business logic 220 and the database interface module 225. The logging module 245 can also be configured to provide logging and exception handling for all the coupled modules (205-225). The aforementioned module can provide functions which may be commonly called by the rest of the modules (205-225) of the service portal 105. The logging module 245 can be implemented using aspect-oriented programming as known to those skilled in the art.

Figure 3:
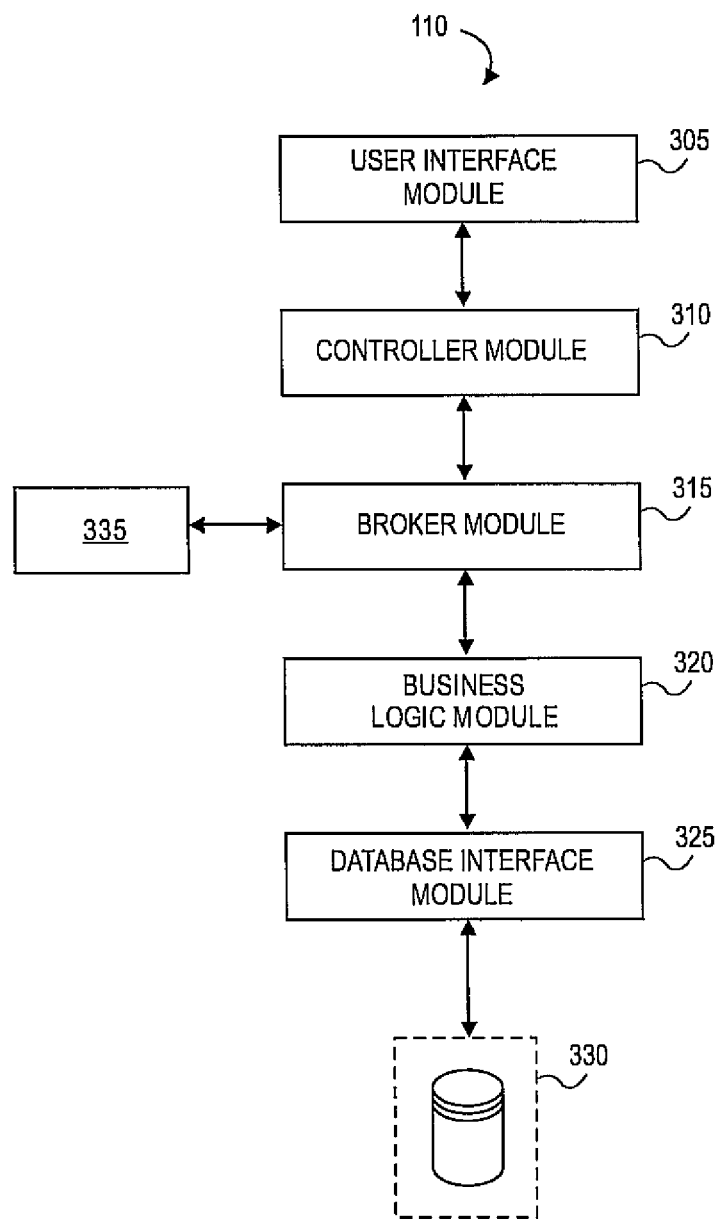
FIG. 3 depicts an exemplary knowledge server of the system shown in FIG. 1 in accordance with yet another embodiment.

FIG. 3 illustrates a more detailed block diagram of the knowledge server 110 in accordance with another embodiment. It should be readily apparent to those of ordinary skill in the art that the knowledge server 110 depicted in FIG. 3 represents a generalized schematic illustration and that other components may be added or existing components may be removed or modified.

FIG. 2 and FIG. 3 share some common components. As such, the description of the common components is being omitted and the description of these components with respect to the FIG. 2 is being relied upon to provide adequate description of the common components.

As shown in FIG. 3, the knowledge server 110 can comprise at least a user interface module 305, a controller module 310, a broker module 315, a business logic module 320 and a database interface module 325.

Similar to the service portal 105, the user interface module 305 of the knowledge server 110 can be configured to provide the GUIs for users to interact with the knowledge server 110. The functionality for selected actions by the users is provided by the controller module 310. The controller module 310 can be configured to provide the associated code for the requested functionality of the selected action in the GUI. The broker module 315 can be configured to provide high-level business logic for the knowledge server 110. More particularly, the broker module 315 can provide filtering for the requests entering the knowledge server 110. For these requests, the broker module 315 can receive these requests from the service portal 105 through the server interface 335. The server interface 330 can be implemented using simple object access protocols, web services, etc. The knowledge server 110 can also user the server interface 335 to return requested information to the service portal 105. Unlike the service portal 105, the knowledge server 110 can be configured to prevent direct access to the knowledge server 110 but can only be accessed through the service portal 105.

The broker module 315 of the knowledge server 110 can also be coupled to the business logic module 320, which is configured to contain the logic to provide the desired business services as received from the broker module 315 such as processing requests for the database 330. The business logic module 325 can also provide a schema for queries into the knowledgebase database 330. The database interface module 325 can be configured to provide a level of abstraction between the queries from the broker module 320 to the actual physical implementation of the knowledgebase database 330. As previously described, the knowledgebase database 330 can be implemented with database architectures provided by vendors such as MySQL, Oracle, Sybase, International Business Machines, and other similar manufacturers.

The modules 305-325 of the service portal 105 can also be implemented using be implemented using an open source servlet container and webserver such as Tomcat™ in some embodiments. Other embodiments can use proprietary servlet containers and webserver technologies.

Figure 4:
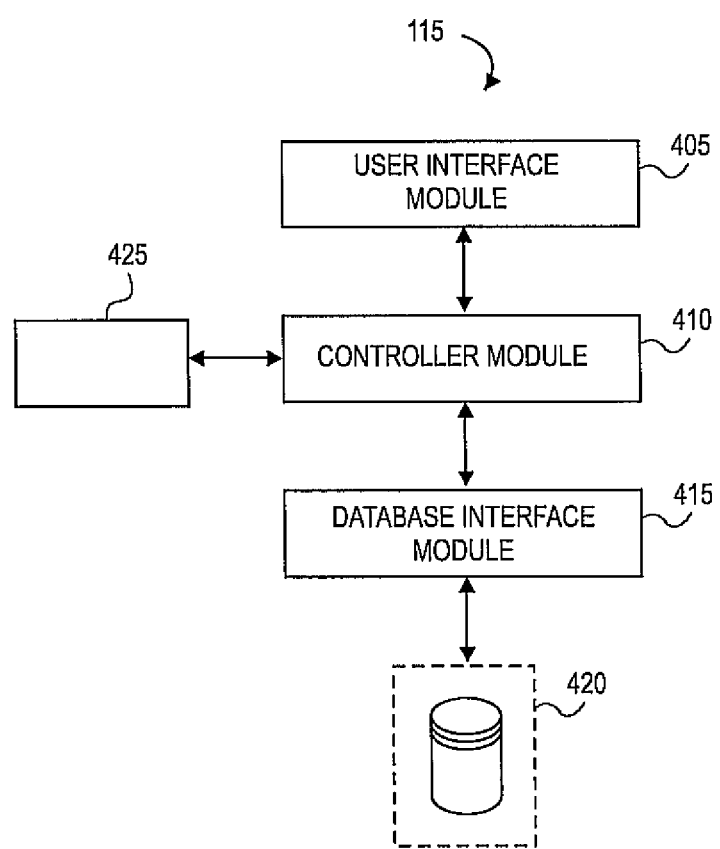
FIG. 4 illustrates an exemplary issue tracker server of the system shown in FIG. 1 in accordance with yet another embodiment.

FIG. 4 illustrates a more detailed block diagram of the issue tracker server 115 in accordance with another embodiment. It should be readily apparent to those of ordinary skill in the art that the issue tracker server 115 depicted in FIG. 4 represents a generalized schematic illustration and that other components may be added or existing components may be removed or modified.

As shown in FIG. 4, the issue tracker server 115 can comprise a user interface module 405, a controller module 410, a database interface module 415, and a server interface 425. Similar to the service portal 105 and the knowledge server 110, the user interface module 405 of the issue tracker server 115 can be configured to generate GUIs for the service portal 105 to interface thereto. As with the knowledge server 110, the service portal 105 provides a unified interface to the issue tracker server 115. The service portal 105 can be configured to receive requests from users to access the issue tracker server 115. The received requests are processed by the issue tracker server 115 and any information is returned using the issue tracker server's GUIs as generated by the user interface module 405. The service portal 105 reformats any returning information from the issue tracker server 115 and the other servers in a unified GUI generated by the user interface module 205 of the service portal 105. In some instances, the service portal 105 can generate an overlay for data arriving from the other servers (110-120). Accordingly, a user can be presented with information in a consistent format.

The user interface module 405 can be implemented using HTML code, CSS sheets, Hypertext Pre-Processor ("PHP") code and/or Ruby on Rails (ROR) code. The controller module 410 can provide the associated code for the functionality provided by the GUIs generated by the user interface module 405.

The controller module 410 can be configured to communicate with the service portal 105, the knowledge server 110 and the chat server through a communication interface 425. The communication interface 425 can use SOAP or web service protocols over the Internet to provide the communication conduit.

The controller module 410 can also be configured to interface with the database 420. The database 420 can be configured to store the open and closed service tickets. The database 420 can also be configured to store links to or the actual articles, chats session used to resolve the issue. In some embodiments, the database 420 can be implemented using MySQL 5.x database or other open source database. Other embodiments, the database 420 can be implemented proprietary databases such as Oracle, Sybase, IBM, etc.

Although FIG. 4 depicts the user interface module 405, controller module 410, and the database interface module 415 as separate components, these modules (405-415) can be implemented using LAMP, which is an open source Web development platform based on Linux, Apache, MySQL, and PHP.

Figure 5:
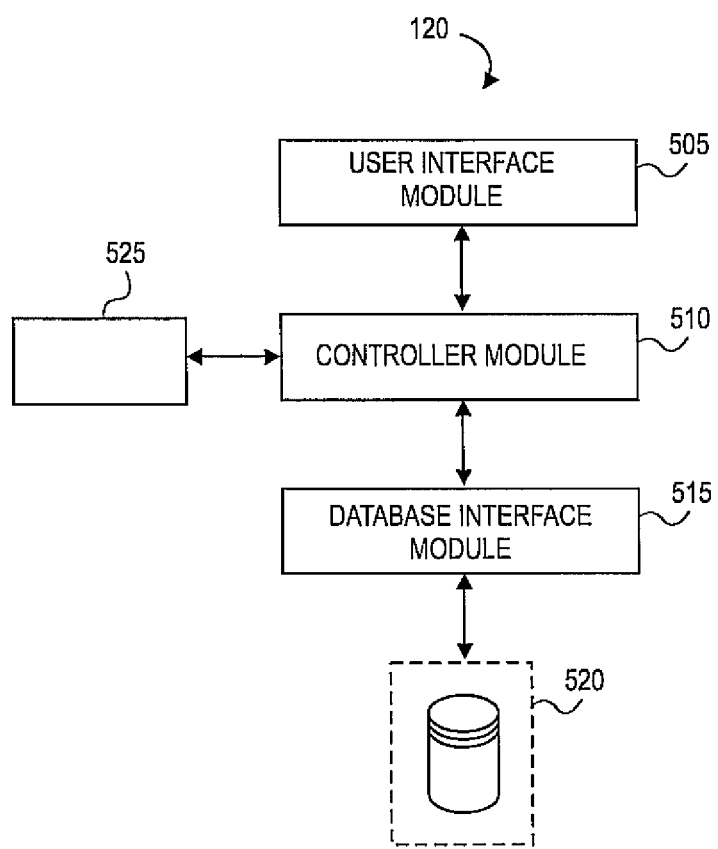
FIG. 5 depicts an exemplary chat server of the system shown in FIG. 1 in accordance with yet another embodiment.

FIG. 5 illustrates a more detailed block diagram of the chat server 120 in accordance with another embodiment. It should be readily apparent to those of ordinary skill in the art that the chat server 120 depicted in FIG. 5 represents a generalized schematic illustration and that other components may be added or existing components may be removed or modified.

The chat server 120 can be configured to provide chat services for users. The chat server 120 can provide a communication link between users and a group of support personnel. The chat server 120 can also provide a communication link between users of the service portal 105. The users can request access to support through a GUI of the service portal 105. Some embodiments can use Openfire to provide group and instant messaging service using the Extensible Messaging and Presence Protocol ("XMPP").

As shown in FIG. 5, the chat server 120 can comprise a user interface module 505, a controller module 510, a database interface module 515 and a database 520. The user interface module 505 of the chat server 120 can be configured to generate GUIs for the service portal 105 to interface thereto. The user interface module 505 can be implemented using HTML code, CSS, and/or Java Server pages.

As with the knowledge server 110 and the issue tracker server 115, the service portal 105 provides a unified interface to the chat server 120. The service portal 105 can be configured to receive requests from users to access the chat server 115. The received requests are processed by the chat server 120 to start a chat session with someone from a group of technical support personnel.

The received requests for chats can be processed by the controller module 510, which contains the associated code for the selected function in the GUI by a user. The controller module 510, in some embodiments, can be implemented using DWR.

The controller module 510 can also interface with a database interface module 515. The database interface module 515 can be configured to translate queries from the controller module 510 to appropriate format of the database 520 to store and retrieve information. The information stored in the database 520 can comprise of chat sessions between users and support personnel. In some embodiments, the database 520 can be implemented with a MySQL database. Returning to the database interface module 515, this module 515 can be implemented using plain old Java objects as known to those skilled in the art.

Although FIG. 5 depicts the user interface module 505, controller module 510, and the database interface module 515 as separate components, other embodiments can implement the functionality of these modules can be implemented using Tomcat Servlet container and web server from Apache Software Foundation.

Returning to FIG. 2, the service portal 105 can be configured with a configuration module 250 embedded in the controller module 210. The configuration module 250 can be configured to provide a mechanism for users to configure a computer system and have the proposed computer system instantiated on-line. The configuration module 250 can be configured to allow a user to enter configuration data, e.g., desired/existing hardware platform, desired/existing operating system, number of issues, security concerns, desired/existing software application, etc. In some embodiments, the user can request an interactive communication session with technical support personnel to obtain the configuration data and/or to answer questions.

The configuration module 250 can then be configured to instantiate a virtual machine of the user-specified system based on the configuration data file. The virtual machine can then be placed on a secure site, such as server farm 255. The configuration module 250 can then provide access to the user-specified virtual machine via virtual private network or a remote web access.

The server farm 255 can be implemented as a collection of servers that can be securely accessed by users. The servers in the server farm 255 can be from various manufacturers such as Dell, Hewlett Packard, Transmeta, Intel and other similar hardware vendors. The servers of the server farm 255 can be configured to execute an operating system capable of supporting virtual machines, such as Red Hat Linux 5.X.

Although FIG. 1 depicts the configuration module 250 and the server farm 255 coupled with the knowledge server, the configuration module 250 could be implemented on the other servers of system 100 without departing from the spirit and scope of the claimed invention. Similarly, the server farm 255 can be coupled to the other servers of system 100 or could be implemented by a third party.

Figure 6:
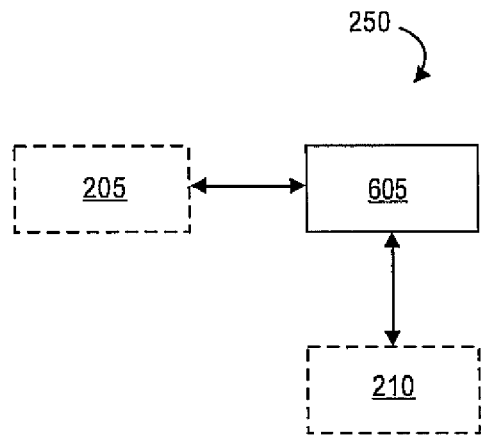
FIG. 6 illustrates an exemplary diagram of the configuration module in accordance with yet another embodiment.

FIG. 6 illustrates a block diagram of the configuration module 250 in accordance with yet another embodiment. It should be readily apparent to those of ordinary skill in the art that the configuration module 250 depicted in FIG. 6 represents a generalized schematic illustration and that other components may be added or existing components may be removed or modified.

As depicted in FIG. 6, the configuration module 250 comprises of a manager module 605 coupled to the user interface module 205, and the controller module 210. The manager module 605 is configured to implement the functionality of the configuration module 250 as previously described and described in greater detail below with respect to FIGS. 7-8. The manager module 605 can be implemented in software code (Java, C, C++, etc.), hardware device (application specific integrated circuit, field programmable gate array, microprocessor, etc.) or combinations thereof.

Although manager module 605 is depicted as a separate module in FIG. 2, it is readily obvious to those of ordinary skill in the art that the functionality of the manager module 605 can be implemented within the controller module 210 or the broker module 215 without departing from the teachings of the present invention.

The manager module 605 can access the user interface module 205 through the existing controller module 210 interfaces with the user interface module 205 as previously described. The user interface module 205 can be configured to generate GUIs to allow a user, among other things, to log-in into the service portal, select auto-configuration or assisted configuration of virtual machines, request live technical assistance, etc. GUIs building is a well known to those skilled in the art as evidenced by GUI toolkits such as VisualBasic™, Java, VisAge, etc.

The manager module 605 can be configured to access the server farm 255 via the controller module 210. The controller module 210 can be configured to access a network interface (not shown) to communicate with the other servers and/or the server farm 255.

Accordingly, the manager module 605 can be configured to invoke the GUI module 205 to generate a GUI requesting a user to select auto-configuration or assisted configuration to create a virtual machine instance of a desired computer system. If the user selects the auto-configuration mode, the manager module 605 invokes the GUI module 205 to generate a second GUI that requests the user to input configuration data for the desired computer system. The configuration data can include hardware platform, software applications, number of users, security concerns, etc.

When the user finishes inputting the requested configuration data, the manager module 605 can be configured to take the entered configuration data and generate a configuration file for the virtual machine of the desired computer system. The requirements for the configuration file can be dependent on the operating system as known to those skilled in the art. From the configuration file, the virtual machine can be instantiated by the manager module 605 on a server in the server farm 255.

The manager module 605 can then configured to contact the user via mail message or voice message that the virtual machine of the desired computer system is ready for access and operational. The message can include how to access the virtual machine by remote web access or virtual private network login.

If the user selects assisted configuration mode, this mode can be similar to the auto-configuration mode. More particularly, the manager module 605 can be configured to generate a third GUI that contains a window in response to the selection of the assisted configuration mode. The window can be configured to provide an interactive communication session, e.g., instant message, chat, or voice over Internet Protocol ("VOIP"), to an available technical support personnel of the service portal 105. The interactive communication session can be provided by the chat server 120.

The technical support personnel can communicate with the user to obtain the configuration data through the interactive communication session. Subsequently, the technical support personnel can forward the configuration data to the manager module 605 to be processed into a configuration file. Subsequently, the configuration file can be instantiated as a virtual machine and hosted on the server farm 255 as previously described.

Figure 7:
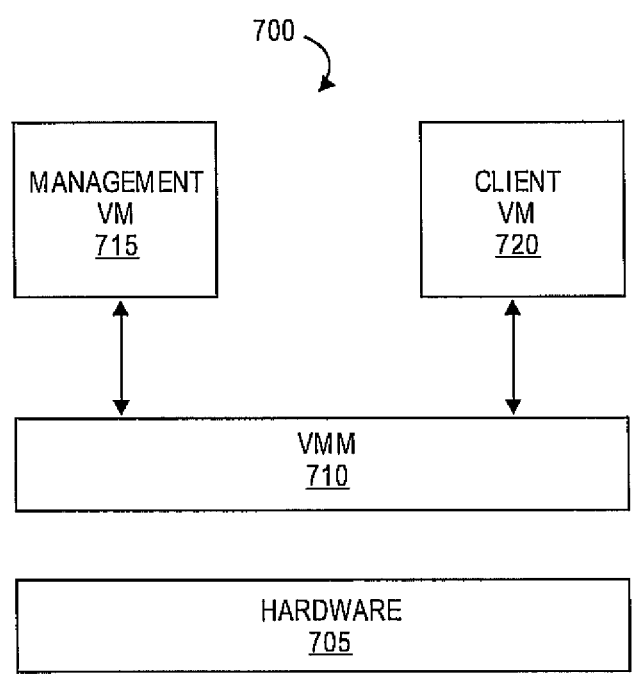
FIG. 7 depicts an exemplary flow diagram implemented by the configuration module in accordance with yet another embodiment.

FIG. 7 depicts an exemplary client virtual machine 700 in accordance with yet another embodiment. As shown in FIG. 7, the virtual machine 700 can be implemented using a general purpose computer and the like. For example, virtual machine 700 can comprise hardware 705 that comprises items, such as a processor, cache, memory, network interface card, etc. Such equipment is well known to those skilled in the art. In addition, virtual machine 700 can include virtualization software. In particular, virtual machine 700 may comprise a virtual machine monitor 710 (labeled as VMM in FIG. 7), a management virtual machine 715, and a client virtual machine 720.

VMM 710 is the software responsible for virtualizing hardware 705 and client machine 700 into logically separate virtual machines, such as virtual machines 715 and 720. Accordingly, this allows a client machine 700 to execute software applications, while at the same being monitored by an external agent, such as secure service site, without interfering with the progress of the client machine 700.

VMM 710 can be a thin layer of software that runs on a host operating system that directly accesses hardware 705. VMM 710 can virtualize various hardware resources of hardware 705 and allow multiple virtual machines, such as virtual machines 715 and 720, to transparently multiplex the resources of hardware 705.

Management virtual machine (VM) 715 tracks the operational status of client VM 720. For example, management VM 715 can directly examine for information, such as memory and register contents, and I/O device flags, to determine the operational status of client VM 720. Management VM 715 may also collect performance characteristics such as disk I/Os, cache hits, temperature, disk utilization, etc. as applications are executed by client VM 720. These results may include information about: all the processes currently running on client VM 720; processes which are currently holding sockets; contents of virtual memory; and contents of the task structure for a particular process; processor utilization; and the like. In addition, management VM 715 may provide certain administrative functions related to managing virtual machine 700, such as logging events, providing remote access, configuration management, and communications. These functions are well known to those skilled in the art.

Client VM 720 may be referred to as the "client" virtual machine because it is the virtual machine that executes the software applications selected by the client. The operating system running inside of client VM 720 and applications running inside of client VM 720 can be specified based on the requirements of the client.

Figure 8:
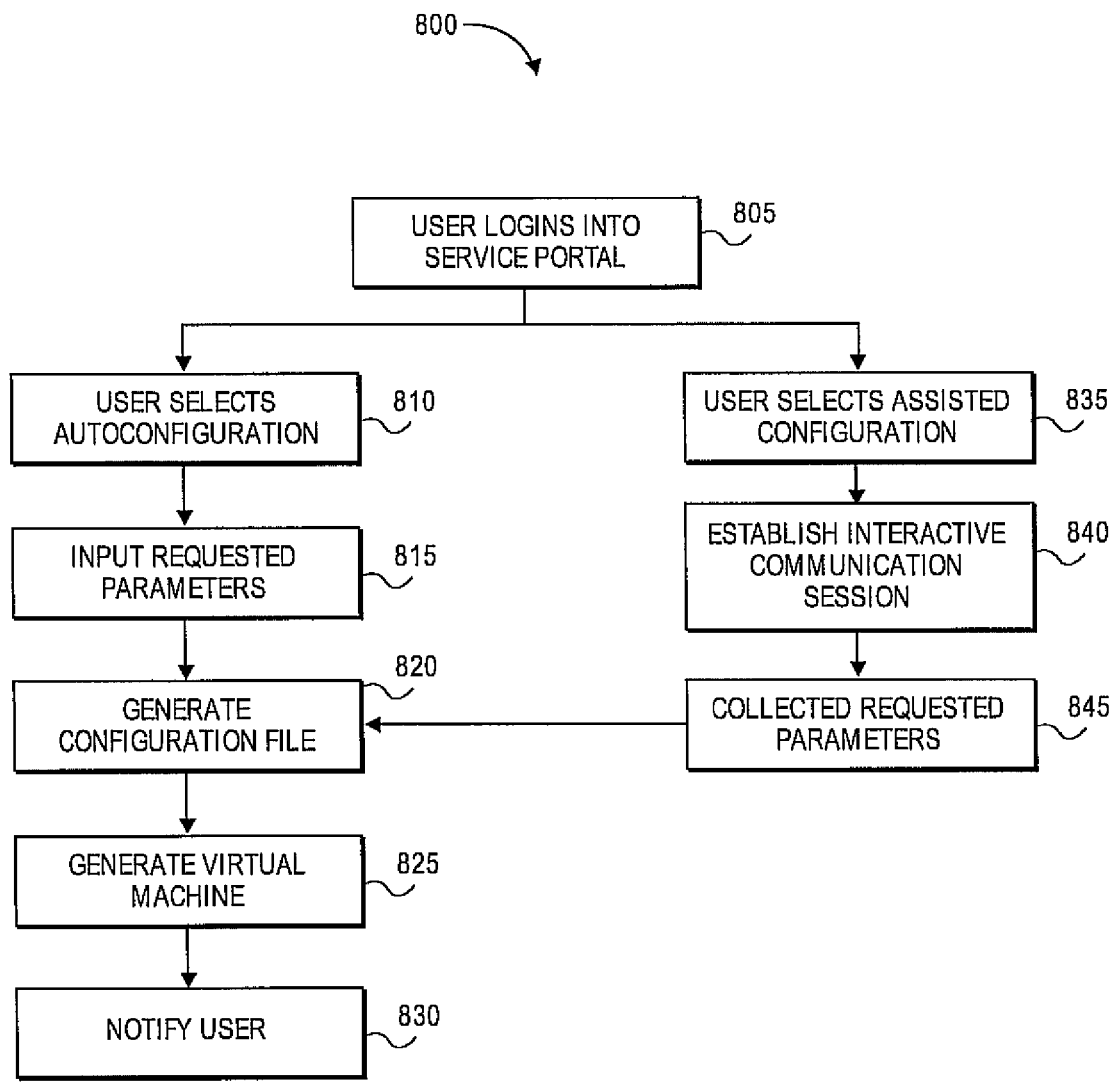
FIG. 8 illustrates another exemplary flow diagram implemented by the configuration module in accordance with yet another embodiment.

FIG. 8 illustrates a flow diagram 800 implemented by the configuration module 250. It should be readily apparent to those of ordinary skill in the art that the flow diagram 800 depicted in FIG. 8 represents a generalized schematic illustration and that other steps may be added or existing steps may be removed or modified.

As shown in FIG. 8, the user can log into the service portal 105, in step 805. More particularly, a user can access the service portal 105 using a local web browser (e.g., Opera, Mozilla, Internet Explorer, etc.) to a log-in GUI. Typically, a returning user can log-in with an existing user identification and password or a new user can register for a user identification and password. The manager module 605 can then generate a general menu GUI that queries the user for a next course of action. As part of the general menu GUI, a user can select a virtual deployment option which includes two sub-choices: auto-configuration mode or assisted configuration mode.

If the user selects auto-configuration mode in step 810, the manager module 605 can be configured to generate a configuration data GUI, which is configured to receive configuration data from the user. The configuration data can include desired/existing hardware, desired/existing software applications, number of users, security level, etc. The manager module 605 can be configured to enter a wait state until the user selects a completion or done button on the configuration data GUI, in step 815.

In step 820, the manager module 605 can be configured to generate a configuration file based on the configuration data. The format of the configuration data can be dependent on the selection of the operating system. For example, Linux Red Hat 5.0 has a configurator function that generates the configuration file.

In step 825, the manager module 605 can place the configuration file on a selected server within the server farm 225 and generate a user-specified virtual machine based on the configuration file. In step 830, the manager module 605 can be configured to send a message to the user notifying how the user can log into the user-specified virtual machine either by web access or virtual private network. Subsequently, the manager module 605 can be configured to enter a wait state.

Returning to step 835, if the user selects the assisted configuration mode, the manager module 605 can be configured to generate a chat window in an assisted GUI, in step 840. The manager module 605 can send a request to the chat server 120 to provide the chat window services as well as connecting an available technical support personnel for the user.

In step 840, the manager module 605 can be configured to enter a wait state until the selected support personnel assists the user in taking in the configuration data as previously described. Once the selected support personnel collects the configuration data, the support personnel can send the configuration data to the manager module 605 to generate the configuration file in step 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    establishing a first communication session with a service portal accessible over a network adapter to configure a virtual machine instantiation;
    receiving, via the first communication session at the service portal and in relation to the virtual machine instantiation, an indication of a selection between an auto configuration mode to indicate a prompt for a requirement associated with the virtual machine instantiation and an assisted configuration mode to indicate that a technical support person is to provide the requirement associated with the virtual machine instantiation;
    receiving the requirement, at the service portal, for the virtual machine instantiation, wherein the requirement specifies a number of users of a virtual machine corresponding to the virtual machine instantiation and is received via the first communication session in response to a selection of the auto configuration mode and wherein the requirement is received from the technical support person via a second communication session in response to a selection of the assisted configuration mode, wherein the second communication session is between the technical support person and the service portal;
    generating a configuration file using:
        the requirement received from the prompt via the first communication session and in view of a first graphical user interface when the auto configuration mode is selected; and
        the requirement received from the technical support person via the second communication session in view of a second graphical user interface when the assisted configuration mode is selected via the first communication session; and
    instantiating, by a processor, the virtual machine in view of the requirement that specifies the number of users of the virtual machine in the configuration file.

2. The method of claim 1, further comprising providing another graphical user interface to allow the request for the virtual machine instantiation to be submitted to the service portal.

3. The method of claim 1, wherein the requirement comprises one of a software application or a hardware component.

4. The method of claim 1, further comprising establishing a third communication session between a system establishing the first communication session and the technical support person.

5. The method of claim 4, wherein the third communication session is established in response to a selection of the assisted configuration mode.

6. The method of claim 4, wherein the third communication session comprises an instant messaging session.

7. The method of claim 4, wherein the third communication session comprises one of a video conference session and a voice-over-Internet protocol session.

8. The method of claim 1, further comprising providing remote access to the virtual machine, wherein the remote access is one of a login via a virtual private network or a universal resource locater to a secure web-site.

9. The method of claim 1, further comprising providing a copy of the virtual machine.

10. A system comprising:
    a memory; and
    a processor operatively coupled to the memory and to:
        establish a first communication session with a service portal to configure a virtual machine instantiation,
        receive, via the first communication session and in relation to the virtual machine instantiation, an indication of a selection between an auto configuration mode to indicate a prompt for a requirement associated with the virtual machine instantiation and an assisted configuration mode to indicate that a technical support person is to provide the requirement associated with the virtual machine instantiation,
        receive the requirement for the virtual machine instantiation, wherein the requirement specifies a number of users of a virtual machine corresponding to the virtual machine instantiation and is received via the first communication session in response to a selection of the auto configuration mode and wherein the requirement is received from the technical support person via a second communication session in response to a selection of the assisted configuration mode, wherein the second communication session is between the technical support person and the service portal,
        generate a configuration file using:
            the requirement received from the prompt via the first communication session and in view of a first graphical user interface when the auto configuration mode is selected, and
            the requirement received from the technical support person via the second communication session and in view of a second graphical user interface when the assisted configuration mode is selected via the first communication session, and
        instantiate the virtual machine in view of the requirement that specifies the number of users of the virtual machine in the configuration file.

11. The system of claim 10, wherein the processor is to provide another graphical user interface that allows the request for the virtual machine instantiation to be submitted to the service portal.

12. The system of claim 10, wherein the requirement comprises one of a software application and a hardware component.

13. The system of claim 10, wherein the processor is to establish a third communication session between a system establishing the first communication session and the technical support person.

14. The system of claim 13, wherein the processor is to establish the third communication session in response to a selection of the assisted configuration mode.

15. The system of claim 13, wherein the third communication session comprises an instant messaging session.

16. The system of claim 13, wherein the third communication session comprises one of a video conference session or a voice-over-Internet protocol session.

17. The system of claim 10, wherein the processor is to provide remote access to the virtual machine, wherein the remote access is one of a login via a virtual private network or a universal resource locater to a secure web-site.

18. The system of claim 10, wherein the service portal is to provide a copy of the virtual machine.

19. A non-transitory computer readable medium having instructions stored therein, which when executed, cause a processor to:
  establish a first communication session with a service portal accessible over a network adapter, to configure a virtual machine instantiation;
  receive, via the first communication session at the service portal and in relation to the virtual machine instantiation, an indication of a selection between an auto configuration mode to indicate a prompt for a requirement associated with the virtual machine instantiation and an assisted configuration mode to indicate that a technical support person is to provide the requirement associated with the virtual machine instantiation;
  receive the requirement, at the service portal, for the virtual machine instantiation, wherein the requirement specifies a number of users of a virtual machine corresponding to the virtual machine instantiation and is received via the first communication session in response to a selection of the auto configuration mode and wherein the requirement is received from the technical support person via a second communication session in response to a selection of the assisted configuration mode, wherein the second communication session is between the technical support person and the service portal;
  generate a configuration file using:
    the requirement received from the prompt via the first communication session and in view of a first graphical user interface when the auto configuration mode is selected; and
    the requirement received from the technical support person via the second communication session and in view of a second graphical user interface when the assisted configuration mode is selected via the first communication session; and
  instantiate, by the processor, a virtual machine in view of the requirement that specifies the number of users of the virtual machine in the configuration file.

20. The non-transitory computer readable medium of claim 19, wherein the processor is further to provide another graphical user interface to allow the request for the computer system instantiation to be submitted to the service portal.

21. The non-transitory computer readable medium of claim 19, wherein the requirement comprises one of a software application or a hardware component.

* * * * *